Oct. 31, 1939.　　　　A. MADLÉ　　　　2,178,399
VARIABLE SPEED TRANSMISSION
Filed Aug. 1, 1938　　　　4 Sheets-Sheet 1

INVENTOR.
ALAIN MADLÉ
BY John W. Michael
ATTORNEY.

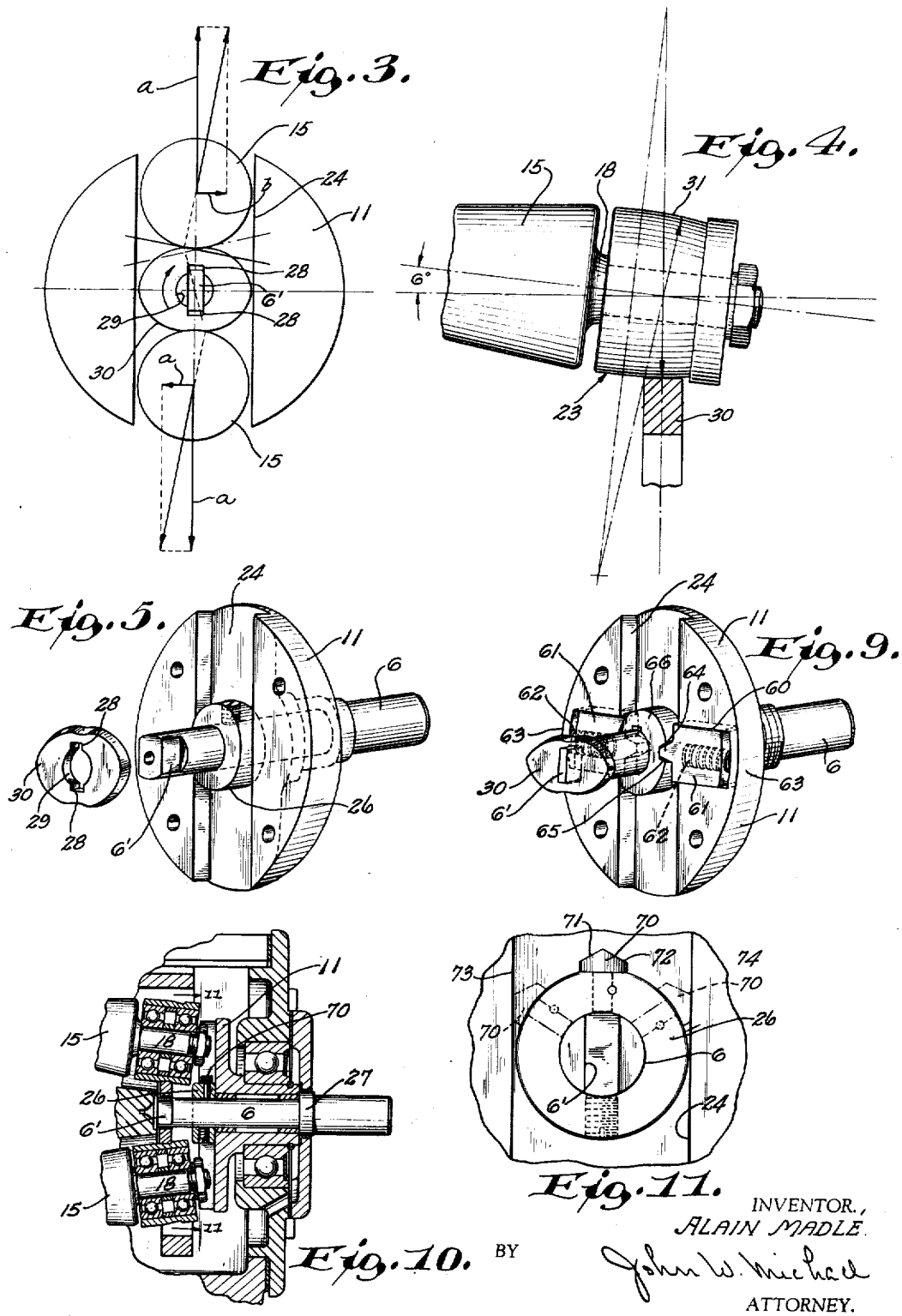

Oct. 31, 1939.  A. MADLÉ  2,178,399
VARIABLE SPEED TRANSMISSION
Filed Aug. 1, 1938  4 Sheets-Sheet 3

INVENTOR.
ALAIN MADLÉ
BY John W. Michael
ATTORNEY.

Oct. 31, 1939.  A. MADLÉ  2,178,399

VARIABLE SPEED TRANSMISSION

Filed Aug. 1, 1938  4 Sheets-Sheet 4

INVENTOR.
ALAIN MADLÉ
BY
John W. Michael
ATTORNEY.

Patented Oct. 31, 1939

2,178,399

UNITED STATES PATENT OFFICE 2,178,399

VARIABLE SPEED TRANSMISSION

Alain Madlé, Milwaukee, Wis., assignor to Graham Transmissions Inc., Milwaukee, Wis., a corporation of Delaware Application August 1, 1938, Serial No. 222,394

14 Claims. (Cl. 74—281)

This invention relates to an improvement in variable speed transmissions of the type wherein a plurality of longitudinally tapered planet rollers are controlled in their action by an axially movable control ring and the working or driving pressure between the rollers and the ring is developed by virtue of the joint action of a torque responsive cam loading device and the fulcrumed mounting of the rollers thereby obtaining a working pressure between rollers and ring which automatically conforms to the requirements of both speed and load.

In transmissions of this type each planet roller has its small end rockably as well as rotatably mounted on the rotary carrier so as to be tiltable transversely of the carrier into pressure contact with the ring. The bearing for the large end of each roll is mounted in a pillow block or bearing support which is shiftable transversely of the carrier to provide for the rocking movement of its rollers. The torque responsive device comprises a cam constrained to rotate with the input shaft and engaging the pillow blocks or supports for the bearings at the large ends of the rollers.

One of the objects of the present invention is to so constitute and combine the bearing supports and the cam that there is a rolling action set up between the cam and the bearing supports when the cam turns or winds up as the working pressure is developed between the rollers and their control ring. In such an organization the force for developing the working pressure is transmitted with mechanical advantage through the cam and bearing supports to the rollers without danger of the parts binding or locking.

Another object of the invention is to improve and simplify the means provided for shifting the control ring axially or longitudinally of the planet rollers.

Another important object of the invention is to provide means effective to protect the parts of the transmission against shock loads and stress occurring as the result of the high starting torque absorbed when the control ring is positioned at the small ends of the planet rollers. This protection may be afforded by providing stops between the shaft and the rotary carrier to limit the relative rotation of the cam with respect to the carrier and provide for positive transmission of the drive when the stops are engaged, or a clutch may be combined with the transmission so that, when starting, the rotary carrier will be positively driven by the input shaft until it is brought up to speed, whereupon the clutch is disengaged under the influence of centrifugal force, and the cam takes over the function of transmitting motion from the input shaft to the carrier as well as its part in developing the required working pressure between the planet rollers and their control ring.

A still further object of the invention is to simplify, compact and improve the construction of a machine of this character, lower its cost, and enhance its efficiency and its adaptability for diverse application.

Other objects and advantages reside in certain novel features of the construction, arrangement, and combination of parts which will be hereinafter more fully described and particularly pointed out in the appended claims, reference being had to the accompanying drawings forming a part of this specification, and in which:

Figure 3 is a diagrammatic view illustrating the rolling action between the cam and the bearing supports and the manner in which the forces are resolved;

Figure 4 is a view partly in elevation and partly in cross section illustrating the formation of the rounded tapered recesses in the bearing supports and the way in which they coact with the cam;

Figure 5 is a perspective view showing the removable end plate of the carrier, the input shaft and the torque responsive cam;

Figure 9 is a perspective view illustrating the removable end plate of the carrier and showing how the clutch is combined therewith;

Figure 10 is a fragmentary sectional view showing the transmission equipped with a stop arrangement for limiting the travel of the cam relative to the carrier;

Figure 11 is a view in transverse vertical cross section taken on line 11—11 of Figure 10;

Figure 1:
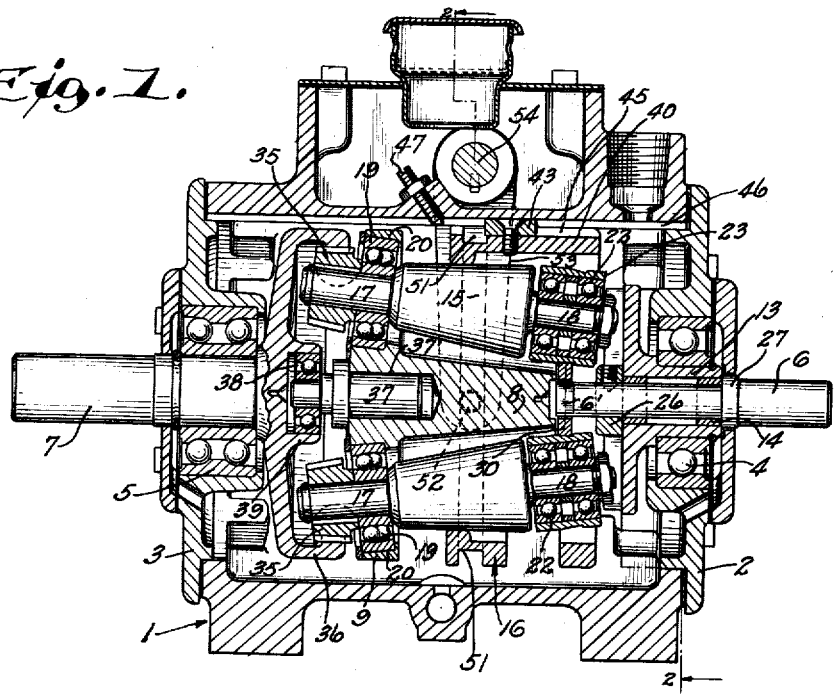
Figure 1 is a view in central vertical longitudinal section showing a transmission constructed in accordance with the present invention, parts being shown in elevation for the sake of illustration.

Referring to the drawings, it will be seen that in all embodiments of the invention the transmission comprises a housing designated generally at 1 having removable end plates 2 and 3 carrying the ball bearing assemblies 4 and 5 for the input and output shafts designated at 6 and 7 respectively. A rotary carrier 8 is supported for rotation in the housing and operatively interrelated to the input and output shafts. One of the end plates 9 of the carrier is integral with the longitudinal members 10 of the body portion thereof, whereas the other carrier end plate 11 is detachably secured to the body members of the carrier by means of suitable bolts. The end plate 11 is provided with a hub portion 13 projecting therefrom and rotatably supported in the bearings 4. Short sleeve bearings 14 are interposed between the inner periphery of the hub 13 and the input shaft 6.

Two longitudinally tapered or conical planetary rollers designated at 15 are mounted on the carrier for rotation therewith and with respect thereto and for rocking movement transversely thereof.

A control ring or traction ring 16 encircles the planet rollers and is axially shiftable lengthwise of the rollers to control their motion.

Each roller 15 is provided with journals or trunnions 17 and 18 at its ends.

A spherical bearing assembly 19 cooperates with the trunnion 17 of each roller 15 and is in turn supported and releasably secured in an opening 20 provided therefor in the adjacent end plate 9 of the carrier. The bearing assembly 19 is designed so as to support its planet roller for rotation about its own axis and for rocking or tilting movement transversely with respect to the rotary carrier. For this purpose each bearing assembly 19 may have its outer race provided with a spherical inner surface engageable with the balls in a manner common in this type of ball bearing, or its outer race may have a spherical outer surface slidably interfitted with the correspondingly formed wall of the opening 10.

Each trunnion 18 at the large end of each roller is supported for rotation in a double ball bearing assembly 22 which in turn is mounted in a cylindrical or sleeve-like bearing support or pillow block 23. Each bearing support 23 is mounted for shifting movement in a slot or guideway 24 provided therefor in the end plate 11 of the rotary carrier. The slot or guideway 24 extends diametrically across the end plate 11.

The input shaft 6 extends through the central portion of this slot or guideway. A collar 26 is secured by a set screw to the shaft 6 and is located in the central portion of the guideway, the collar engaging the floor of the guideway to prevent axial movement of the input shaft in one direction. A flange or collar 27 on the outer portion of the shaft 6 coacts with the outer end of the hub 13 to prevent axial movement of the shaft 6 in the opposite direction.

The inner end of the input shaft 6 is flattened as at 6' and slidably interfitted with notches 28 provided at diametrically opposite points of the central opening 29 of a cam designated at 30 (see Figures 3, 5 and 9). The interengagement of the flattened inner end of the input shaft with the notches of the cam constrain the cam to rotate with the input shaft but allows it to float radially to free the input shaft of reaction forces due to any eccentricities of the control ring. The cam 30 is engageable with the peripheral surface of the sleeve-like bearing supports 23 and in order to insure rolling contact and free, smooth, and effective action, the peripheral surfaces of the sleeve-like supports are formed with tapered and rounded recesses 31, any element of which is in the form of an arc struck in the manner indicated by the construction lines in Figure 4.

With such a structure when the cam winds up and the rollers shift with respect thereto, there is contact between the peripheral surface of the recess 31 and some portions of the periphery of the cam intermediate its side edges. In this way engagement of either edge of the cam with the peripheral surface of the bearing support is prevented. Due to the cylindrical or sleeve-like formation of the supports 23 the cam is engageable therewith with a rolling action or contact. This is desirable for the cam transmits to the support a substantial force (represented by vector $a$ in Figure 3). In other words, it transmits the torque as modified by the wedge angle. The movement of the supports 23 in the guideway 24 is in the nature of a sliding movement but this is entirely immaterial as such movement occurs under the influence of only a very small normal force as illustrated by vector $b$ in Figure 3.

Just beyond the bearing 19 each trunnion 17 has a planet pinion 35 keyed thereto. The two planet pinions 35 mesh with an internal ring gear 36 formed integral with the output shaft 7. The adjacent end of the carrier is supported on this ring gear 36 and for this purpose a stud shaft 37 is provided and has a portion press fitted into an opening 37' in the carrier. The projecting portion of the stud shaft is mounted in a roller bearing 38 supported in a recess 39 in the hub portion of the ring gear.

Figure 6:
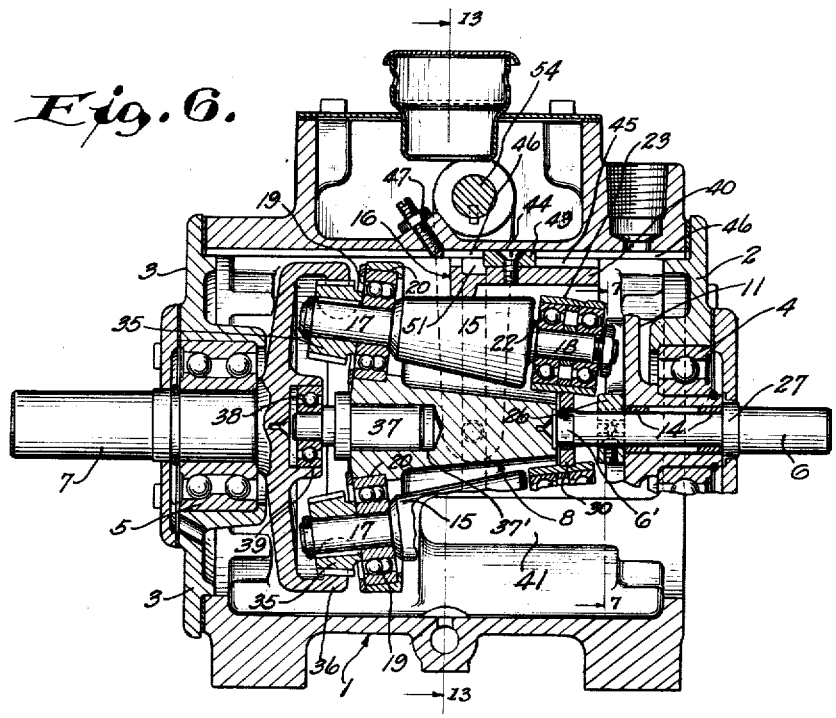
Figure 6 is a view similar to Figure 1 but showing the transmission equipped with a spring engaged centrifugally released clutch, portions of the rotary carrier and one of the planet rollers being broken away to illustrate the supports for the control ring.
Figures 7, 8:
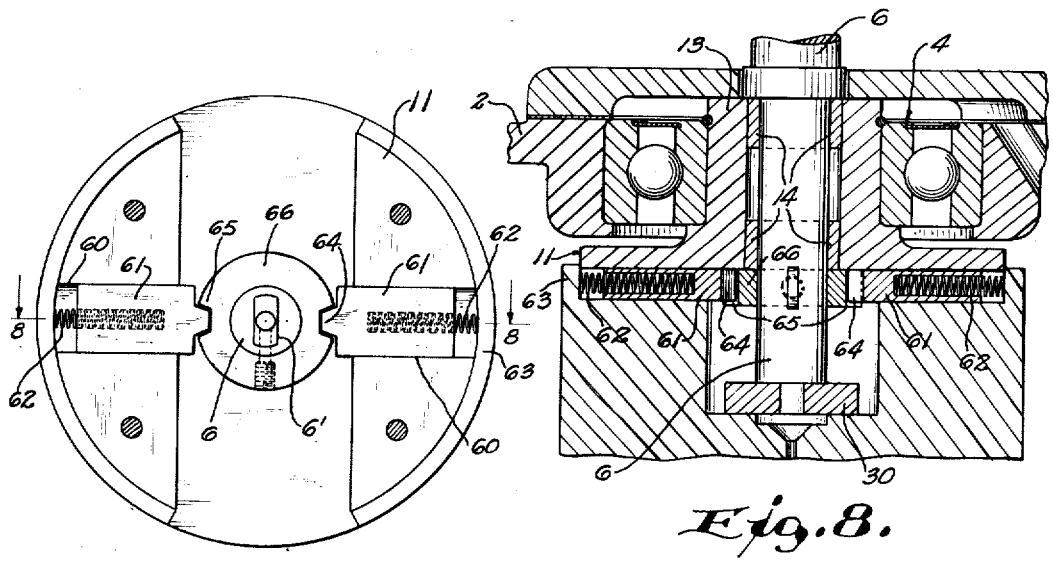
Figure 7 is a view in transverse cross section taken on line 7—7 of Figure 6.
Figure 8 is a view in horizontal cross section taken on line 8—8 of Figure 7.
Figure 13:
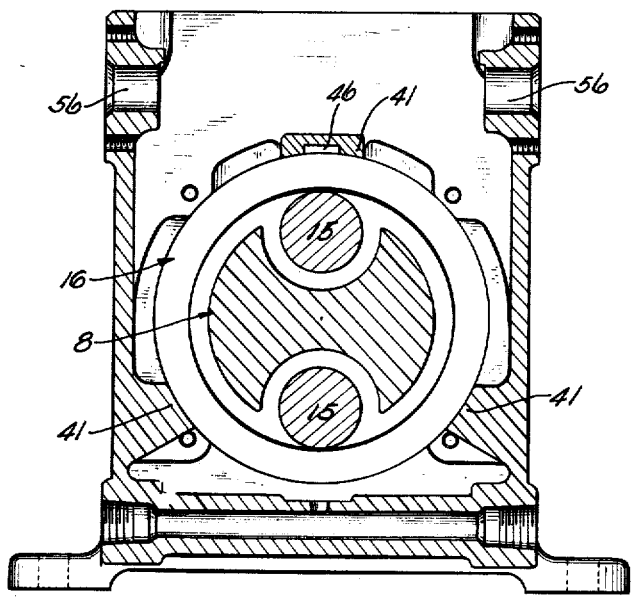
Figure 13 is a view in transverse vertical cross section illustrating the lands or guideways on which the control ring axially slides.

The traction ring or control ring 16 is formed at one end of an annular or band-like structure 40 which is of considerable length in order to afford the desired bearing contact to preclude canting or cocking of the ring. The band-like structure is slidably supported on lands or guideways 41 provided at angularly spaced points about the interior of the housing (see Figures 6 and 13). The control ring 16 is constrained to sliding movement and held against rotation by means of a key 43 secured by a screw 44 in a keyway 45 provided in the periphery of the band-like structure and also slidable in a keyway 46 provided in the inner wall of the housing.

A stop screw 47 projects into this keyway and is engageable with the key 43 to limit the movement of the ring in one direction. The movement of the ring in the opposite direction is limited by virtue of the engagement of one end thereof with one of the end plates of the housing.

Figure 2:
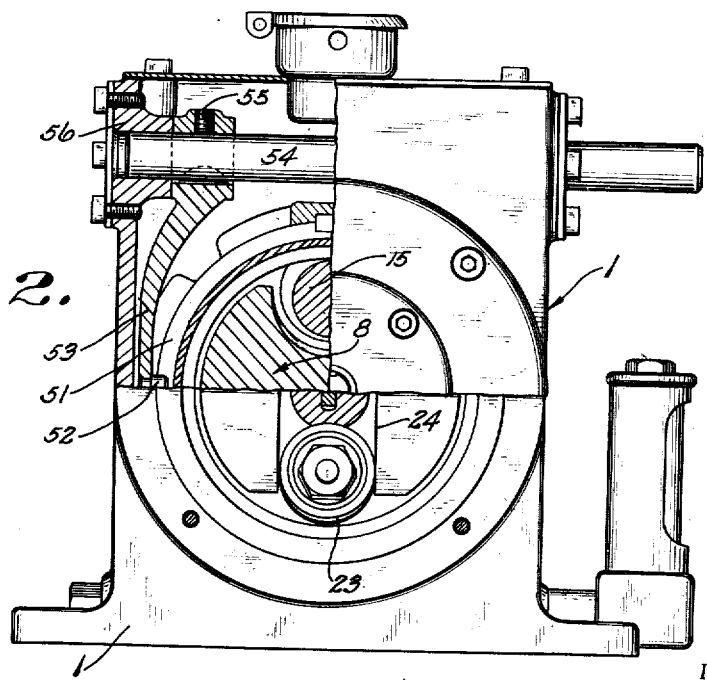
Figure 2 is a view taken on line 2—2 of Figure 1.

The control ring is provided with arcuate slots 50 to lighten it and is also provided near one end with an annular groove 51. Pins 52 carried by the lower ends of yoke arms 53 project into the groove 51 at the center of the ring. The upper ends of these yoke arms are formed with bearings fitted on a control shaft 54 and secured thereto by means of set screws 55 or the like. The control shaft extends transversely of the housing over the control ring and is rotatably supported in bearings 56 provided therefor in the front and rear walls of the housing (see Figures 2 and 13). It may project at one or both ends beyond the housing so as to facilitate its connection with a hand wheel or lever control. When the shaft 54 is turned the yoke arms are swung and the control ring is shifted lengthwise of the planet rollers. This construction is especially advantageous in that it requires only an angular movement of 30°, that is 1/12th of the revolution of the control shaft 54 to traverse the control ring over the entire length of the planet rollers.

Figure 12:
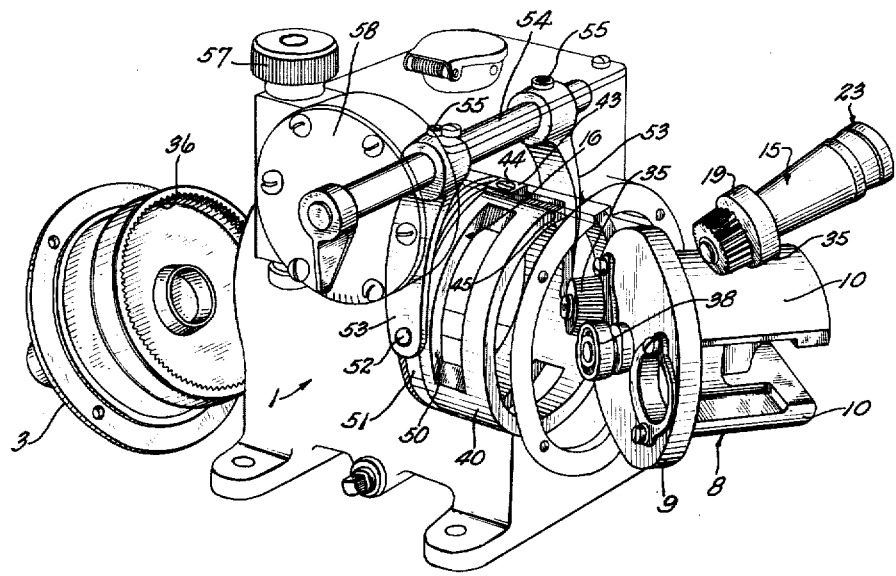
Figure 12 is a group view in perspective showing the various parts of the transmission partially disassembled.

As shown in Figure 12, the control ring may be adjusted from a rotatable operating or control knob 57 connected to shaft 54 through suitable worm gearing enclosed in gear casing 58.

In the commercial manufacture of transmissions of the character here contemplated it sometimes happens that, due to excessive initial clearances and deflections of the parts through which the motion is being transmitted, the cam will somersault when the transmission is started up, that is, the high points of the cam will ride past the sleeve-like supports of the bearings, and if no means is provided to prevent this, undesirable wear and possibly breakage of some of the parts will occur. This is usually likely to happen when the ring is at the small end of the rollers for in this ring position initial clearances are exaggerated for geometrical reasons, the rollers present greater inertia to acceleration and hence absorb higher starting torque and the pressure developed at the cam is applied through the maximum leverage.

The present invention proposes to overcome these conditions in either of two ways. As shown in Figures 6 to 9, the end plate 11 may be provided with radial slots or guideways 60 disposed at right angles to the diametrical slot 24. Clutch blocks 61 are slidably fitted in the slot 60 and are biased inwardly by means of coil springs 62 interposed between the clutch blocks and the outer end wall 63 which close the outer ends of the slots 60. The inner end of each clutch block is provided with a projection or tooth 64 designed to positively interengage with the notch 65 of a clutch collar 66 fixed to the input shaft.

With this construction, when the transmission is started up, the input shaft is positively clutched to the spider so that when starting, the motion of the input shaft is directly transmitted to the rotary carrier through the clutch blocks 61. As the carrier comes up to speed, centrifugal force acting on the clutch blocks will cause them to slide outwardly against the action of the spring 62 until their projections or teeth 64 are disengaged from the notches 65 of clutch collar 66. Before disengagement of the clutch, the rollers have been urged outwardly into contact with their ring solely under the influence of centrifugal force. However, when the clutch is disengaged, the cam 30 comes into action and serves not only to transmit rotary movement from the input shaft 6 to the rotary carrier 8 but also takes over the office of developing the appropriate working pressure between the rollers and their control ring.

In lieu of a spring engaged, centrifugally released clutch of the character just described a stop arrangement may be provided between the input shaft and the rotary carrier to limit the extent of rotation of the cam with respect to the carrier, or rather with respect to the sleeve-like supports 23. As shown in Figures 10 and 11, a stop which is designated at 70, may consist of a headed stud suitably secured to the collar and having sloping faces 71 and 72 selectively engageable with the walls 73 and 74 of the diametrical slot 24, as shown in dotted lines in Figure 11. The parts are designed and proportioned so that the stop will engage either wall 24 before the apex or high point of the cam 29 comes into engagement with the sleeve-like bearing supports 23. After the rollers have been brought up to speed, the cam 30 resumes its normal position under the influence of the elastic forces in the system, that is, under the influence of inherent resiliency of the various parts.

In the operation of the transmission, movement of the control ring along the rollers changes the speed from approximately one-third of the input speed down through zero and reverse. The important requirement in a transmission of this kind is to develop an amount of traction pressure between the rollers and the ring at all times in keeping with the load demand. In the transmission herein disclosed, the pressure derived from the cam is automatically responsive to both the external load and the speed ratio in combination. The rollers are so supported that the leverage of the pressure applied at the cam increases automatically as the ring is moved to the small end of the rollers to lower the speed. This is where added pressure is needed in order to transmit change at the low speeds. Furthermore, the pressure on the cam is also in direct proportion to the load or torque. As a result the drive is positive, non-slip, transmits full motor power over a wide range of speeds, and operates at high efficiency.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A variable speed transmission of the character described comprising a rotary carrier, an axially movable control ring, an inclined conical planetary roller, a bearing supporting the small end of the roller on the carrier for rotation therewith and with respect thereto and for rocking movement into engagement with said ring, said carrier having a radial guideway adjacent the large end of the roller, a bearing for the large end of the roller, a rounded support for said last named bearing mounted in said radial guideway, a drive shaft and a cam constrained to rotate with the drive shaft and having its periphery in rolling contact with said rounded bearing support.

2. A variable speed transmission of the character described comprising a rotary carrier, an axially movable control ring, two inclined conical planetary rollers, bearings supporting the small ends of the rollers on the carrier for rotation with and with respect thereto and for rocking movement into engagement with said ring, said carrier having radial guideways adjacent the large ends of the rollers, bearings for the large ends of the rollers, rounded supports for said last named bearings mounted in said radial guideways, a drive shaft and a cam constrained to rotate with the drive shaft and having its periphery in rolling contact with the rounded bearing supports, said bearing supports having their peripheries formed with tapered portions formed on an arc whereby to insure contact between the tapered peripheral portions of the rollers and the peripheral surface of the cam at a point intermediate the edges of the cam.

3. A variable speed transmission of the character described comprising a rotary carrier, an axially movable control ring, a tapered inclined planetary roller rotatable with and with respect to said carrier and movable into pressure contact with the ring, a drive shaft, a cam constrained to rotate with drive shaft and cooperable with the roller to move the roller into pressure contact with the ring, and interengageable means between the drive shaft and the carrier for positively driving the carrier from the drive shaft when the transmission is started up.

4. A variable speed transmission of the character described comprising a rotary carrier, an axially movable control ring, a tapered inclined planetary roller rotatable with and with respect to said carrier and movable into pressure contact with said ring, a drive shaft, a cam constrained to rotate with the drive shaft and cooperable with the rollers to move the rollers into pressure contact with the ring, and a spring engaged, centrifugally releasable clutch interposed between the rotary carrier and the drive shaft.

5. A variable speed transmission of the character described comprising a rotary carrier, an axially movable control ring, a tapered inclined planetary roller rotatable with and with respect to said carrier and movable into pressure contact with said ring, a drive shaft, a cam constrained to rotate with the drive shaft and cooperable with the rollers to move the rollers into pressure contact with the ring, and cooperating stops between the drive shaft and carrier and effective to limit the relative movement of the cam and roller and, when engaged, to directly drive the carrier from the drive shaft.

6. A variable speed transmission of the character described comprising a rotary carrier, an axially movable control ring, an inclined planetary roller, means supporting one end of the roller on the carrier for rotation therewith and with respect thereto and for rocking movement into engagement with said ring, said carrier having a guideway adjacent the other end of the roller, a bearing for the other end of the roller disposed in said guideway, a sleeve-like support for said bearing shiftably interrelated with said guideway, a drive shaft, and a cam constrained to rotate with the drive shaft and having its periphery in rolling contact with said support.

7. A variable speed transmission of the character described comprising a rotary carrier, an axially movable control ring, an inclined planetary roller, means supporting one end of the roller on the carrier for rotation therewith and with respect thereto and for rocking movement into engagement with said ring, said carrier having a guideway adjacent the other end of the roller, a bearing for the other end of the roller disposed in said guideway, a sleeve-like support for said bearing shiftably interrelated with said guideway, a drive shaft, and a cam constrained to rotate with the drive shaft and having its periphery in rolling contact with said support, the portion of the support engageable with the cam having a taper.

8. A variable speed transmission of the character described comprising a rotary carrier, an axially movable control ring, an inclined planetary roller, means supporting one end of the roller on the carrier for rotation therewith and with respect thereto and for rocking movement into engagement with said ring, said carrier having a guideway adjacent the other end of the roller, a bearing for the other end of the roller disposed in said guideway, a sleeve-like support for said bearing shiftably interrelated with said guideway, a drive shaft, and a cam constrained to rotate with the drive shaft and having its periphery in rolling contact with said support, the portion of the support engageable with the cam having a taper.

9. A variable speed transmission of the character described comprising a rotary carrier, an axially movable control ring, an inclined planetary roller, means supporting one end of the roller on the carrier for rotation therewith and with respect thereto and for rocking movement into engagement with said ring, said carrier having a guideway adjacent the other end of the roller, a bearing for the other end of the roller, a support for said bearing shiftably mounted in said guideway, a drive shaft, a cam constrained to rotate with the drive shaft and engaging said bearing support, and means for directly driving the carrier from the drive shaft until the carrier is brought up to speed.

10. A variable speed transmission of the character described comprising a rotary carrier, an axially movable control ring, an inclined planetary roller, means supporting one end of the roller on the carrier for rotation therewith and with respect thereto and for rocking movement into engagement with said ring, said carrier having a guideway adjacent the other end of the roller, a bearing for the other end of the roller, a support for said bearing shiftably mounted in said guideway, a drive shaft, a cam constrained to rotate with the drive shaft and engaging said bearing support, and cooperating stop means between the input shaft and the carrier engageable to positively limit the relative movement of the cam with respect to said bearing support.

11. A variable speed transmission of the character described comprising a rotary carrier, an axially movable control ring, an inclined planetary roller, means supporting one end of the roller on the carrier for rotation therewith and with respect thereto and for rocking movement into engagement with said ring, said carrier having a guideway adjacent the other end of said roller, a bearing for said other end of said roller, a support for said bearing shiftably mounted in said guideway, a drive shaft, a cam constrained to rotate with the drive shaft and cooperable with the bearing support, and a clutch between the drive shaft and the rotary carrier including clutch blocks slidably mounted on the carrier and adapted to have driving interengagement with the shaft, means for biasing said clutch blocks to clutching position, said clutch blocks being sufficiently weighted to be released automatically under the influence of centrifugal force when the carrier is brought up to speed.

12. A variable speed transmission of the character described comprising a rotary carrier having end plates and body members interconnecting said end plates, an axially movable control ring, an inclined conical planetary roller, means coacting with one of the end plates for supporting one end of the roller on one of said end plates for rotation with and with respect to the carrier, and for rocking movement into engagement with said ring, the other end plate of said carrier having a radially extending guideway adjacent the other end of the roller, a bearing for said other end of the roller, a cylindrical support for said bearing mounted in said guideway, a drive shaft extending into said guideway, and a cam constrained to rotate with the drive shaft and engageable with said bearing support.

13. A variable speed transmission of the character described comprising a rotary carrier having end plates and body members interconnecting said end plates, an axially movable control ring, an inclined conical planetary roller, means coacting with one of the end plates for supporting one end of the roller on one of said end plates for rotation with and with respect to the carrier, and for rocking movement into engagement with said ring, the other end plate of said carrier having a radially extending guideway adjacent the other end of the roller, a bearing for said other end of the roller, a support for said bearing mounted in said guideway, a drive shaft extending into said guideway, a cam constrained to rotate with the drive shaft and engageable with said bearing support, a collar fixed to the shaft and extending into the guideway, and a stop projecting from the periphery of the collar and engageable with the walls of the guideway to limit the relative rotation of the cam with respect to said bearing support.

14. A variable speed transmission of the character described comprising a rotary carrier having end plates and body members interconnecting said end plates, an axially movable control ring, an inclined conical planetary roller, means coacting with one of the end plates for supporting one end of the roller on one of said end plates for rotation with and with respect to the carrier, and for rocking movement into engagement with said ring, the other end plate of said carrier having a radially extending guideway adjacent the other end of the roller, a bearing for said other end of the roller, a support for said bearing mounted in said guideway, a drive shaft extending into said guideway, a cam constrained to rotate with the drive shaft and engageable with said bearing support, said last named end plate also having radially extending slots angularly spaced from said guideway, clutch blocks slidably fitted in said slots and adapted to have clutching engagement with the drive shaft, and means for biasing the clutch blocks into clutching position, said clutching blocks being shifted outwardly under the influence of centrifugal force to disengaged position when the carrier is brought up to speed.

ALAIN MADLÉ.

CERTIFICATE OF CORRECTION.

Patent No. 2,178,399.     October 31, 1939.

ALAIN MADLÉ.

It is hereby certified that error appears in the printed specification of the above numbered patent requiring correction as follows: Page 4, second column, line 9, claim 8, after the word "taper" and before the period insert and being of rounded contour; and that the said Letters Patent should be read with this correction therein that the same may conform to the record of the case in the Patent Office.

Signed and sealed this 5th day of November, A. D. 1939.

(Seal)            Henry Van Arsdale,
              Acting Commissioner of Patents.

mounted in said guideway, a drive shaft extending into said guideway, and a cam constrained to rotate with the drive shaft and engageable with said bearing support.

13. A variable speed transmission of the character described comprising a rotary carrier having end plates and body members interconnecting said end plates, an axially movable control ring, an inclined conical planetary roller, means coacting with one of the end plates for supporting one end of the roller on one of said end plates for rotation with and with respect to the carrier, and for rocking movement into engagement with said ring, the other end plate of said carrier having a radially extending guideway adjacent the other end of the roller, a bearing for said other end of the roller, a support for said bearing mounted in said guideway, a drive shaft extending into said guideway, a cam constrained to rotate with the drive shaft and engageable with said bearing support, a collar fixed to the shaft and extending into the guideway, and a stop projecting from the periphery of the collar and engageable with the walls of the guideway to limit the relative rotation of the cam with respect to said bearing support.

14. A variable speed transmission of the character described comprising a rotary carrier having end plates and body members interconnecting said end plates, an axially movable control ring, an inclined conical planetary roller, means coacting with one of the end plates for supporting one end of the roller on one of said end plates for rotation with and with respect to the carrier, and for rocking movement into engagement with said ring, the other end plate of said carrier having a radially extending guideway adjacent the other end of the roller, a bearing for said other end of the roller, a support for said bearing mounted in said guideway, a drive shaft extending into said guideway, a cam constrained to rotate with the drive shaft and engageable with said bearing support, said last named end plate also having radially extending slots angularly spaced from said guideway, clutch blocks slidably fitted in said slots and adapted to have clutching engagement with the drive shaft, and means for biasing the clutch blocks into clutching position, said clutching blocks being shifted outwardly under the influence of centrifugal force to disengaged position when the carrier is brought up to speed.

ALAIN MADLÉ.

CERTIFICATE OF CORRECTION.

Patent No. 2,178,399.   October 31, 1939.

ALAIN MADLÉ.

It is hereby certified that error appears in the printed specification of the above numbered patent requiring correction as follows: Page 4, second column, line 9, claim 8, after the word "taper" and before the period insert and being of rounded contour; and that the said Letters Patent should be read with this correction therein that the same may conform to the record of the case in the Patent Office.

Signed and sealed this 5th day of November, A. D. 1939.

Henry Van Arsdale,
Acting Commissioner of Patents.

(Seal)